US010348797B1

(12) United States Patent
Burgin et al.

(10) Patent No.: US 10,348,797 B1
(45) Date of Patent: Jul. 9, 2019

(54) NETWORK BROWSER CONFIGURATION

(71) Applicant: Amazon Technologies, Inc., Seattle, WA (US)

(72) Inventors: Joshua Marc Burgin, Seattle, WA (US); Kurt Kufeld, Seattle, WA (US); Peter Sven Vosshall, Bainbridge Island, WA (US); Arun Sundaram, Seattle, WA (US); Jesper Mikael Johansson, Redmond, WA (US); Peter Frank Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 404 days.

(21) Appl. No.: 14/970,400

(22) Filed: Dec. 15, 2015

(51) Int. Cl.
*H04L 29/06* (2006.01)
*H04L 29/08* (2006.01)
*G06F 16/957* (2019.01)
*G06F 16/958* (2019.01)

(52) U.S. Cl.
CPC .......... *H04L 67/02* (2013.01); *G06F 16/9577* (2019.01); *G06F 16/986* (2019.01); *H04L 67/42* (2013.01)

(58) Field of Classification Search
CPC ............... H04L 29/08072; H04L 29/06; H04L 29/0809; H04L 29/06047; H04L 29/08981; H04L 41/0806; H04L 41/12; G06Q 30/02
USPC ....................................................... 709/203
See application file for complete search history.

(56) References Cited

U.S. PATENT DOCUMENTS

| | | | |
|---|---|---|---|
| 7,191,467 B1 * | 3/2007 | Dujari | H04L 63/08 709/220 |
| 7,512,932 B2 | 3/2009 | Davidov et al. | |
| 7,627,814 B1 | 12/2009 | Soldan et al. | |
| 8,510,237 B2 | 8/2013 | Cascaval | |
| 8,555,157 B1 | 10/2013 | Fu | |
| 8,799,412 B2 | 8/2014 | Trahan | |
| 9,167,054 B2 | 10/2015 | Trahan et al. | |
| 9,292,367 B2 | 3/2016 | Mickens | |
| 9,383,932 B2 | 7/2016 | Das Sharma | |
| 9,509,783 B1 | 11/2016 | Hayden | |
| 9,749,202 B1 | 8/2017 | Jain et al. | |
| 9,811,321 B1 | 11/2017 | Karppanen | |
| 2001/0042045 A1 * | 11/2001 | Howard | G06F 21/10 705/51 |

(Continued)

OTHER PUBLICATIONS

Allen, M., HydrateJS by nanodeath, Dec. 14, 2013, http://nanodeath.gihub.io/HydrateJS/.

(Continued)

*Primary Examiner* — Mahran Y Abu Roumi
(74) *Attorney, Agent, or Firm* — Knobbe, Martens, Olson & Bear, LLP

(57) ABSTRACT

Systems, methods, and computer-readable media related to configuration of multiple browser applications to control the functionality of the browser application as at least some content is accessed are provided. The configuration of a server-based browser application and a client-based browser application can be controlled programmatically such that browser configuration can be validated and controlled by at least some content providers. Additionally, the configuration and subsequent processing of content provided by an authenticating content provider can be implemented in a manner to limit content access functionality.

22 Claims, 12 Drawing Sheets

(56) References Cited

U.S. PATENT DOCUMENTS

| | | | |
|---|---|---|---|
| 2002/0009078 A1* | 1/2002 | Wilson | H04L 12/2856 370/389 |
| 2002/0013833 A1* | 1/2002 | Wyatt | G06F 8/67 709/220 |
| 2002/0133627 A1 | 9/2002 | Maes | |
| 2002/0147788 A1 | 10/2002 | Nguyen | |
| 2003/0014478 A1* | 1/2003 | Noble | G06F 9/5083 709/203 |
| 2003/0055610 A1 | 3/2003 | Webber | |
| 2004/0015476 A1 | 1/2004 | Twaddle | |
| 2004/0230903 A1 | 11/2004 | Elza et al. | |
| 2005/0198365 A1 | 9/2005 | Wei | |
| 2006/0136552 A1 | 6/2006 | Krane et al. | |
| 2006/0168101 A1* | 7/2006 | Mikhailov | G06F 17/30861 709/217 |
| 2007/0005622 A1 | 1/2007 | Fernandes et al. | |
| 2007/0192329 A1* | 8/2007 | Croft | G06F 3/1415 |
| 2008/0139191 A1 | 6/2008 | Melnyk | |
| 2008/0313206 A1 | 12/2008 | Kordun et al. | |
| 2009/0168760 A1 | 7/2009 | Katis et al. | |
| 2009/0202159 A1 | 8/2009 | Ström | |
| 2009/0210631 A1 | 8/2009 | Bosworth et al. | |
| 2009/0319776 A1* | 12/2009 | Burch | H04L 63/08 713/155 |
| 2010/0005053 A1 | 1/2010 | Estes | |
| 2010/0077444 A1* | 3/2010 | Forristal | G06F 21/577 726/1 |
| 2010/0313189 A1* | 12/2010 | Beretta | G06F 9/45516 717/148 |
| 2011/0015917 A1 | 1/2011 | Wang et al. | |
| 2011/0145360 A1 | 6/2011 | Sheshagiri et al. | |
| 2011/0252312 A1 | 10/2011 | Lemonik | |
| 2011/0258532 A1 | 10/2011 | Ceze et al. | |
| 2012/0066380 A1 | 3/2012 | Gao et al. | |
| 2012/0173966 A1 | 7/2012 | Powell et al. | |
| 2012/0260157 A1 | 10/2012 | Zhu et al. | |
| 2012/0330984 A1 | 12/2012 | Fablet et al. | |
| 2012/0331228 A1 | 12/2012 | Shatz | |
| 2013/0007100 A1 | 1/2013 | Trahan | |
| 2013/0031459 A1 | 1/2013 | Khorashadi et al. | |
| 2013/0058414 A1 | 3/2013 | Tsuru | |
| 2013/0067086 A1* | 3/2013 | Hershko | H04L 61/157 709/225 |
| 2013/0080636 A1* | 3/2013 | Friedman | H04L 41/08 709/225 |
| 2013/0246906 A1 | 9/2013 | Hamon | |
| 2014/0033019 A1 | 1/2014 | Zhang | |
| 2014/0052702 A1* | 2/2014 | Fierro | G06F 8/65 707/695 |
| 2014/0053064 A1 | 2/2014 | Weber et al. | |
| 2014/0281918 A1* | 9/2014 | Wei | H04L 67/02 715/234 |
| 2015/0026566 A1 | 1/2015 | Hui | |
| 2015/0052596 A1* | 2/2015 | Ayanam | G06F 21/572 726/8 |
| 2015/0089352 A1 | 3/2015 | Conboy et al. | |
| 2015/0161087 A1 | 6/2015 | Khoo | |
| 2015/0205761 A1 | 7/2015 | Shah | |
| 2015/0271188 A1 | 9/2015 | Call | |
| 2016/0057220 A1* | 2/2016 | Gibbs | G06F 8/65 709/203 |
| 2016/0142914 A1* | 5/2016 | He | H04L 67/34 726/12 |
| 2016/0205088 A1* | 7/2016 | Sreesha | H04L 63/0815 726/8 |

OTHER PUBLICATIONS

Gross, R., and A. Wightman, MarioNet Split Web Browser, p. 1, Jan. 1999, https://en.wikipedia.org/wiki/MarioNet_split_web_browser.

Garsiel, T., and P. Irish, How Browsers Work: Behind the Scenes of Modern Web Browsers, http:www.html5rocks.com/en/tutorials/internals/howbrowserswork/, published Aug. 5, 2011, pp. 1-62, retrieved Jun. 25, 2015.

Hickson, I., Ed., Web Storage, W3C Working Draft, Oct. 29, 2009, pp. 11-18, http://www.w3.org/TR/2009/WD-webstorage-20091029/.

Jquery API Documentation, Feb. 10, 2010, Version 1.2, p. 162, http://api/jquery.com/serialize/.

Wellons, C., Precise JavaScript Serialization With ResurrectJS, Mar. 28, 2013, http://nullprogram.com/blog/2013/03/28/.

* cited by examiner

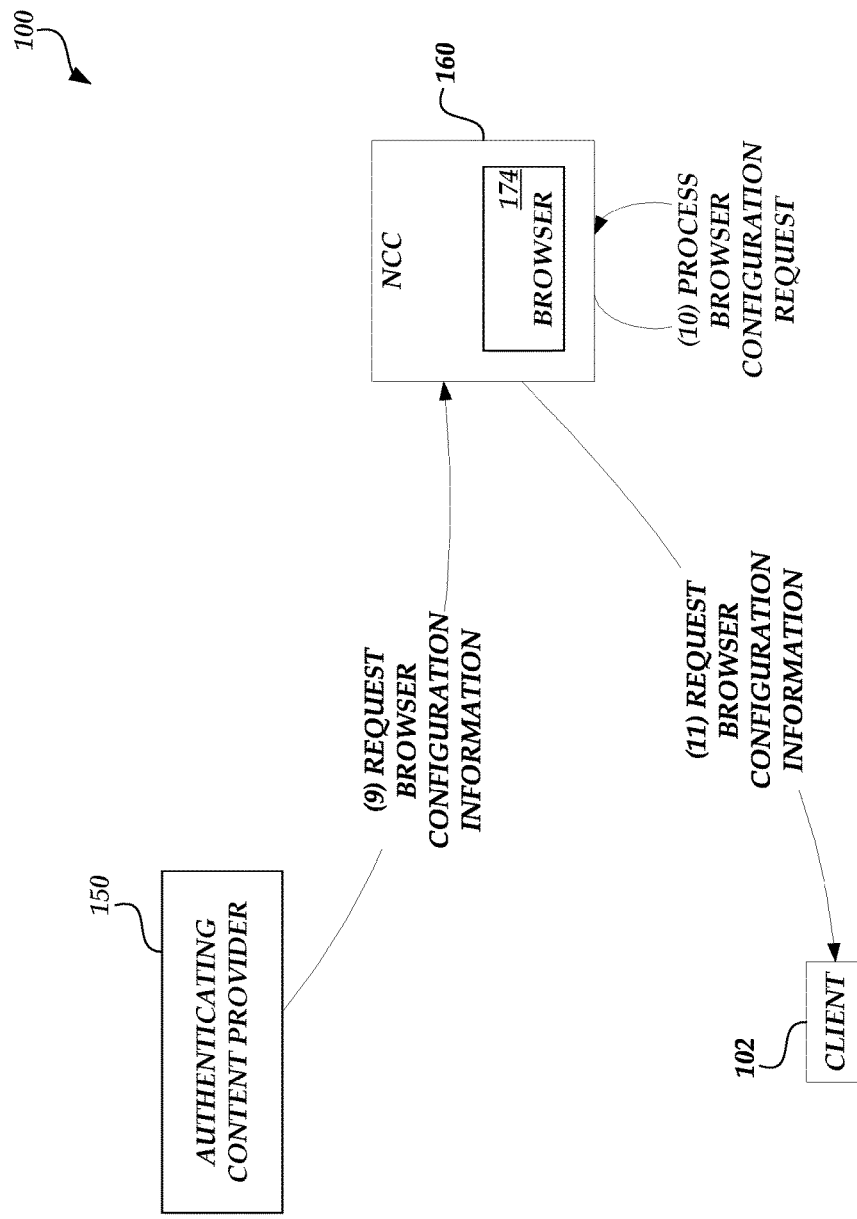

NETWORK BROWSER CONFIGURATION

BACKGROUND

Generally described, computing devices and communication networks can be utilized to exchange information. In a common application, a computing device can request content from another computing device via the communication network. For example, a user at a personal computing device can utilize a software application process, typically referred to as a browser, to request a Web page from a server computing device via the Internet. In such embodiments, the user computing device can be referred to as a client computing device, and the server computing device can be referred to as a content provider.

With reference to an illustrative example, a requested Web page may be associated with a number of additional resources, including static content and dynamic content. For dynamic content, such as video images or video streaming, client computing devices receiving a continuous transmission of content from a content provider require consistent processing of the incoming dynamic content, such as decoding encoded content. In some scenarios, the content provider may want to configure the operation of the browser software application accessing the content, such as by limiting the functionality of the browser application.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIGS. 3A-3D are illustrative block diagrams of the network topology of FIG. 1B illustrating the establishment of specifically configured browser applications and the transmission between the networked computing device and the client computing device;

DETAILED DESCRIPTION

Figure 1A:
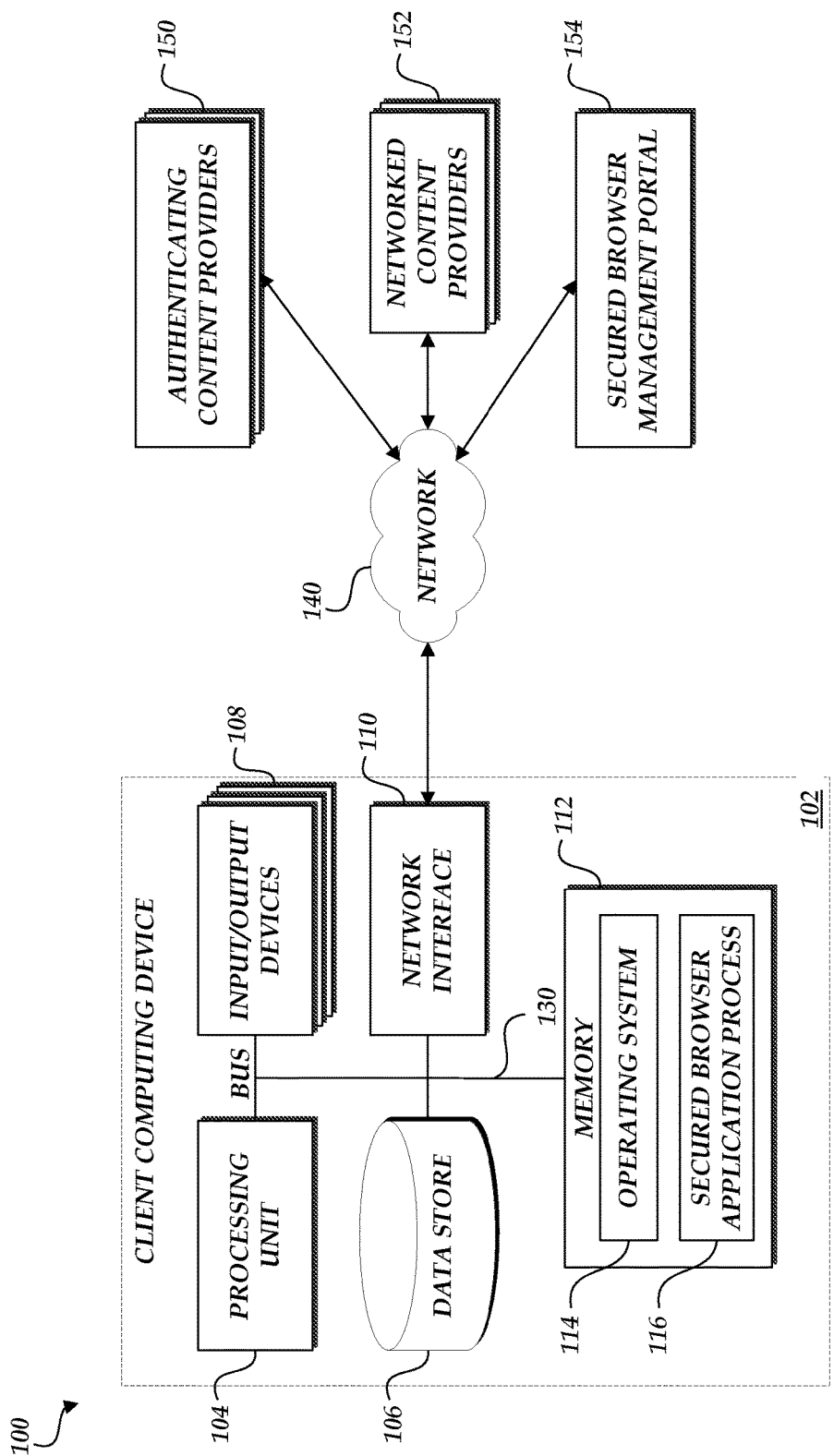
FIG. 1A is a schematic block diagram of an illustrative network topology including a browser application process executing on a client computing device, one or more authenticating content providers, one or more additional content providers, and a secured browser management portal.

Generally described, aspects of the present disclosure are directed to the processing and display of Web content by a client computing device. More specifically, aspects of the present disclosure are directed to systems, methods, and computer-readable media related to configuration of browser applications executed on client computing devices to control the functionality of the browser application as at least some content is accessed. Illustratively, the configuration of the browser application can be controlled programmatically such that the browser configuration can be validated and controlled by at least some content providers. Additionally, the configuration and subsequent processing of content provided by an authenticating content provider can be implemented in a manner such that users of a client computing device and other applications on the client computing device may not have access to modify or otherwise interfere with the operation of the browser software application.

With reference to an illustrative example, a user may cause a client computing device to load and execute a software browser application (henceforth referred to as a "browser") for accessing content provided by one or more content providers. Prior to instantiation of the browser application, the browser application has been programmatically configured in a manner that at least a portion of the configuration of the browser application is part of the executable code. As will be explained in greater detail below, the programmatically controlled configuration includes the ability to limit functionality of the browser application while accessing content.

Subsequent to the browser being loaded, a user or automated browser process may cause the client computing device to transmit a request to access content to a content provider ("content request"). For purposes of the illustration, the content provider receiving the request can be considered to be an authenticating content provider that can limit content being accessed solely to validated, programmatically controlled browser applications. Additionally, the authenticating content provider can further cause the programmatically configured browser application to implement one or more portions of the limited functionality. For example, the authenticating content provider can determine first whether a requesting browser application is a valid, programmatically controlled browser application that is requesting content that may be of a sensitive nature. If the authenticating content provider determines that the browser application is valid, the authenticating content provider can begin transmitting requested content along with instructions that cause the valid, programmatically configured browser application to limit functionality, such as preventing copy/paste functionality, limiting printing functionality, inserting random data for copy or screen capture commands, and the like.

With reference to another illustrative example, a user may cause a client computing device to load and execute a software browser application (henceforth referred to as a "browser") for accessing content provided by one or more content providers. Similar to the previous example, the browser application has been programmatically configured in a manner that at least a portion of the configuration of the browser application is part of the executable code. As will be explained in greater detail below, the programmatically controlled configuration includes the ability to limit functionality of the browser application while accessing content. Additionally, in some embodiments, the client-based browser application has also been configured to interact with a network-based browser application that works in conjunction with the client-based browser application to request and process content. The network-based browser application may also be programmatically configured in like manner as the client-based browser application.

Subsequent to the browser being loaded, a user or automated browser process may cause the client computing device to transmit a request to access content, which is received at the network-based browser. For purposes of the second illustration, the content provider receiving the request can be considered to be an authenticating content provider that can limit content being accessed solely to validated, programmatically controlled browser applications (on the client side, the network side, or both). Additionally, the authenticating content provider can further cause the programmatically configured browser applications to implement one or more portions of the limited functionality. For example, the authenticating content provider can determine first whether a requesting client-based browser application and the corresponding network-based browser application are valid, programmatically controlled browser applications that are requesting content that may be of a sensitive nature. If the authenticating content provider determines that the browser applications are valid, the authenticating content provider can begin transmitting requested content along with instructions that cause the valid, programmatically configured browser applications (either individually or in conjunction) to limit functionality, such as preventing copy/paste functionality, limiting printing functionality, inserting random data for copy or screen capture commands, and the like.

Although various aspects of the embodiments described in the present disclosure will focus, for purposes of illustration, on the remote processing of dynamic content associated with a web browser, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

FIG. 1A is a block diagram illustrative of a networked computing environment 100 for managing content request in accordance with the present disclosure. As illustrated in FIG. 1A, the networked computing environment 100 includes a client computing device 102 ("client") operable to request content from authenticating content providers 150 via a communications network 140. In an illustrative embodiment, the client 102 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances, and the like.

In an illustrative embodiment, the client 102 includes necessary hardware and software components for establishing communications over the communications network 140. For example, the client 102 may be equipped with a network interface 110 that facilitates communications via the network 140. The network 140 can be a publicly accessible network of linked networks, possibly operated by various distinct parties, such as the Internet. In other embodiments, the network 140 may include a private network, local area network ("LAN"), wide area network ("WAN"), cable network, satellite network, wireless telecommunications network, any other medium of computer data transfer, or some combination thereof.

The client 102 may also have varied local computing resources such as a central processing unit 104, data store 106, input/output devices 108, a bus interface 130, memory 112, and so forth. One skilled in the art will appreciate that the client 102 may have more or fewer components than those depicted in illustrative FIG. 1. In an illustrative embodiment, the memory 112 may contain inter alia an operating system 114 and a browser application process 116. As will be explained in greater detail below, the browser software application 116 is a programmatically configured process/component that is illustratively implemented as part of the executable code (e.g., the binary code) of the browser application 116.

The authenticating content providers 150 may illustratively be web servers configured to respond to requests for content via the communication network 140. In some aspects, the authenticating content providers 150 can validate whether a requesting browser application includes a desired secured browser application 116. Additionally, the authenticating content providers 150 can further provide content to a client browser 116, which processes the content in accordance with the programmatic configuration, including limitation of the browser functionality. In some embodiments, one or more content providers 152 may also be web servers that are also configured to respond to requests for content via the communication network 140. In these embodiments, the content providers 152 may either not be configured or otherwise not implement functionality related to the authenticating content providers 150.

With continued reference to FIG. 1A, a secured browser management portal 154 can correspond to one or more components for providing or causing the provision of one or more version of a programmatically programmed browser applications 116. Additionally, the secured browser management portal 154 can also provide information to the authenticating content providers 150 for purposes of validating content requests from secured browser applications 116.

The modules or components illustrated in FIG. 1A may further include additional components, systems, and subsystems for facilitating the methods and processes. For example, in various embodiments, the client 102 may be centralized in one computing device, distributed across several computing devices, implemented by one or more virtual machine instances, or distributed through a network.

Figure 1B:
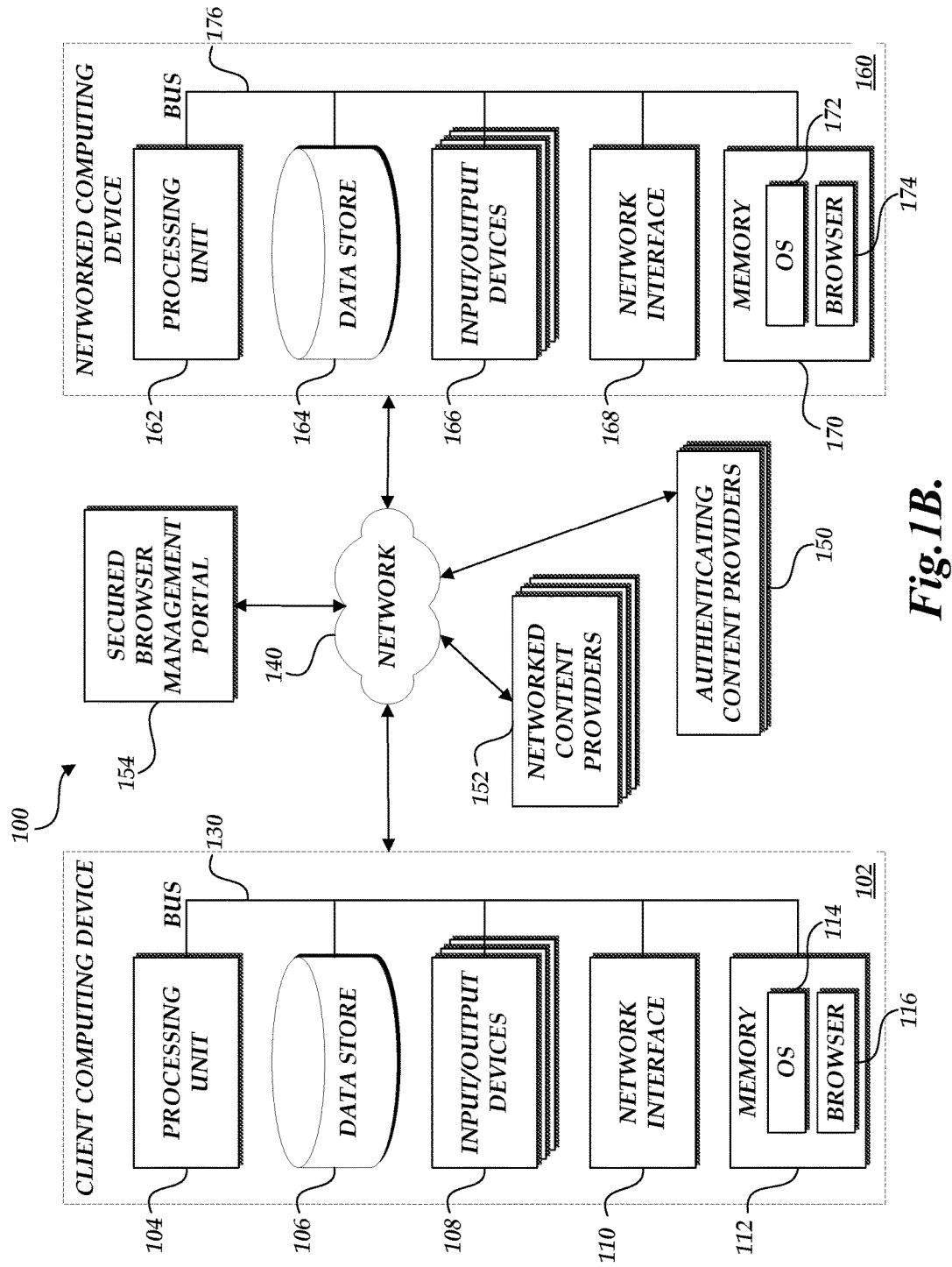
FIG. 1B is a schematic block diagram of an illustrative network topology including a browser application process executing on a client computing device, a browser process executing on a networked computing device, one or more authenticating content providers, one or more additional content providers, and a secured browser management portal.

FIG. 1B is a block diagram illustrative of another embodiment of a networked computing environment 100 for managing content request in accordance with the present disclosure. As illustrated in FIG. 1B, the networked computing environment 100 includes a client computing device 102 operable to request content from authenticating content providers 150 and content providers 152 via a communications network 140. In an illustrative embodiment, the client 102 can correspond to a wide variety of computing devices including personal computing devices, laptop computing devices, hand-held computing devices, terminal computing devices, mobile devices, wireless devices, various electronic devices and appliances, and the like.

In an illustrative embodiment, the client 102 includes necessary hardware and software components for establishing communications over the communications network 140. For example, the client 102 may be equipped with a network interface 110 that facilitates communications via the network 140. The network 140 can be a publicly accessible network of linked networks, possibly operated by various distinct parties, such as the Internet. In other embodiments, the network 140 may include a private network, local area network ("LAN"), wide area network ("WAN"), cable network, satellite network, wireless telecommunications network, any other medium of computer data transfer, or some combination thereof.

The client 102 may also have varied local computing resources such as a central processing unit 104, data store 106, input/output devices 108, a bus interface 130, memory 112, and so forth. One skilled in the art will appreciate that the client 102 may have more or fewer components than those depicted in illustrative FIG. 1. In an illustrative embodiment, the memory 112 may contain inter alia an operating system 114 and a browser application process 116. As will be explained in greater detail below, the browser software application 116 is a programmatically configured process/component that is illustratively implemented as part of the executable code (e.g., the binary code) of the browser application 116.

Similar to the client computing device 102, the networked computing device 160 illustratively includes necessary hardware and software components for establishing communications over the communications network 140, such as a central processing unit 162, data store 164, memory 170, bus interface 176, and so forth. The network computing device 160 may optionally be equipped with input/output devices 166 for direct user interaction, and may be equipped with a network interface 168 that facilitates communications on the network 140.

One skilled in the art will appreciate that the networked computing device 160 may have more or fewer components than those depicted in illustrative FIG. 1. In an illustrative embodiment, the memory 170 may contain inter alia an operating system 172 and a browser application process 174. In some embodiments, the browser application process 174 is a programmatically configured process/component that is illustratively implemented as part of the executable code (e.g., the binary code) of the browser application 116. Additionally, as previously described, in some embodiments, the browser application 174 and the browser application 116 may be further configured to cooperate in the processing of content requests from content providers. In this regard, the browser applications may be configured such that at least some portion of the requested content can be processed on the server-based browser application 174 and the processing results delivered to the client-based browser application for display.

The authenticating content providers 150 may illustratively be web servers configured to respond to requests for content via the communication network 140. In some aspects, the authenticating content providers 150 can validate whether a requesting browser application includes a desired secured browser application 116. Additionally, the authenticating content providers 150 can further provide content to the server-based browser 174 for transmission to a client browser 116.

Further, the modules or components illustrated in FIG. 1A may include additional components, systems, and subsystems for facilitating the methods and processes. For example, in various embodiments, the client 102 may be centralized in one computing device, distributed across several computing devices, implemented by one or more virtual machine instances, or distributed through a network.

Figure 2A:
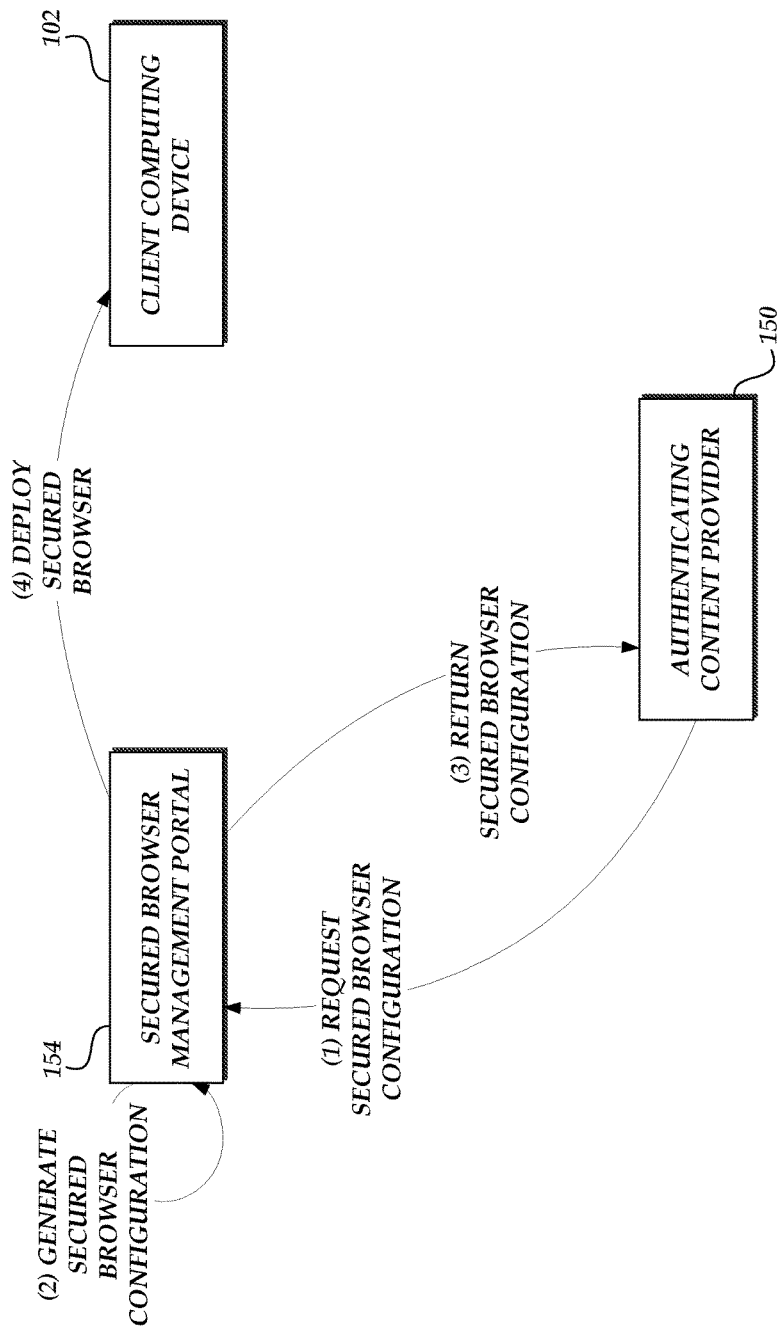
FIGS. 2A-2C are illustrative block diagrams of the network topology of FIG. 1A illustrating the establishment of specifically configured browser applications and the transmission between the networked computing device and the client computing device.
Figure 2B:
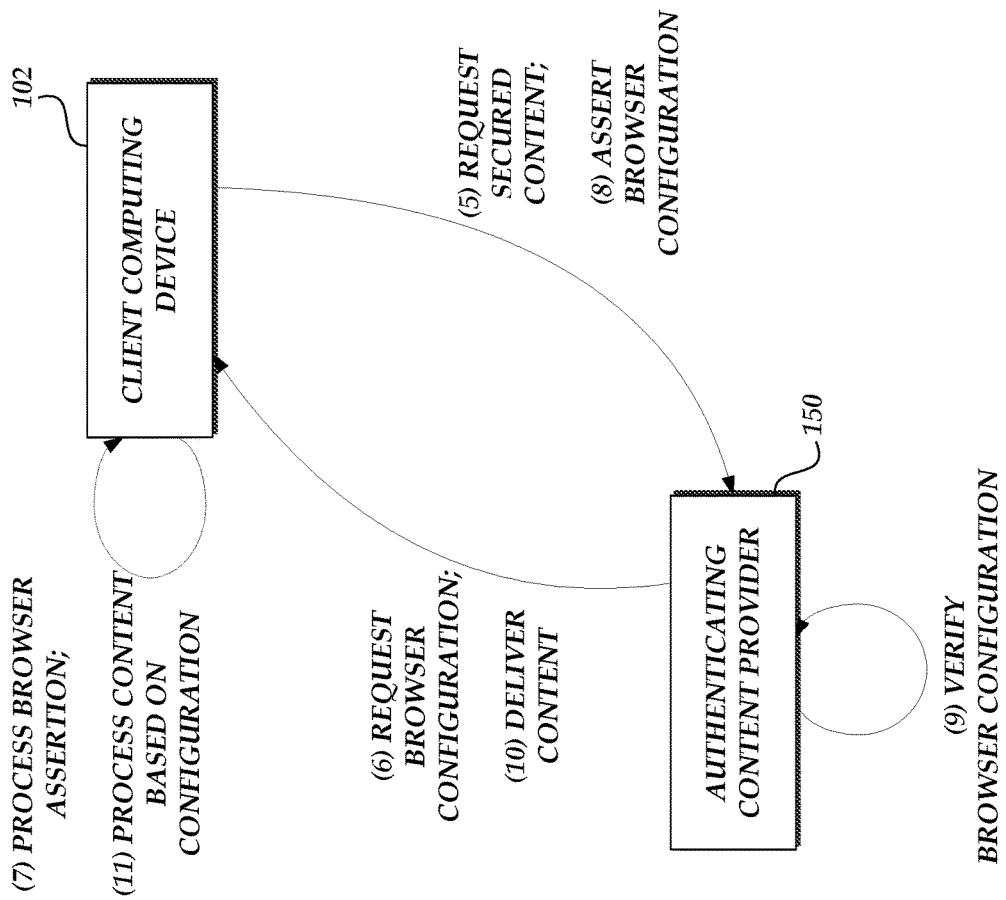
Figure 2C:
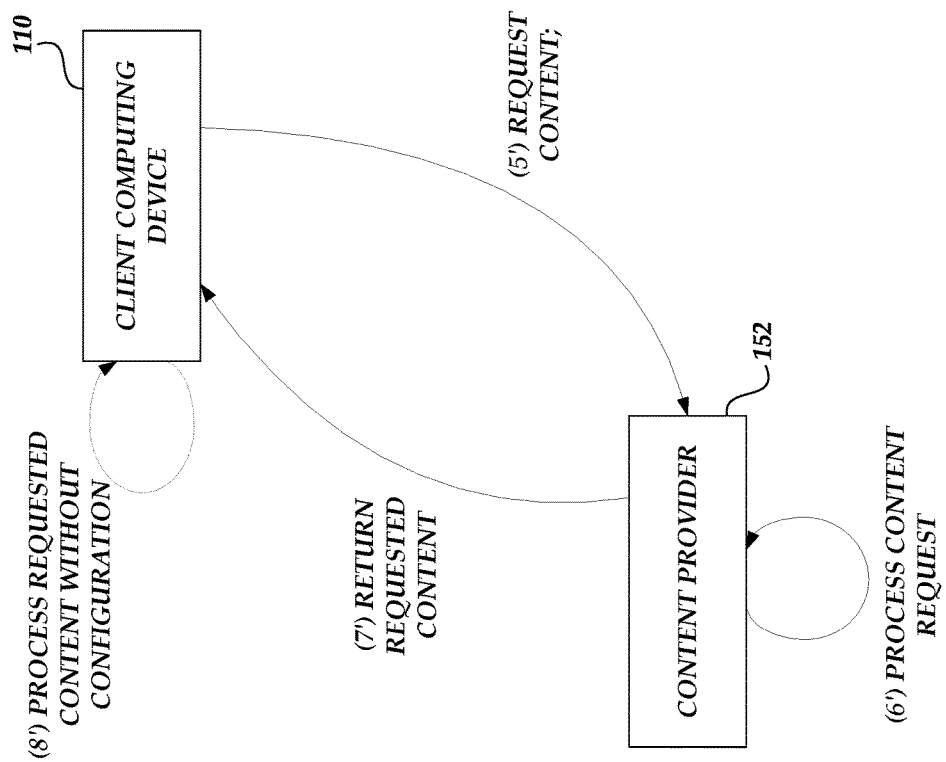

With reference now to FIGS. 2A-2C, block diagrams of the network topology of FIG. 1A illustrating the provisioning of programmatically controlled browser applications and processing of content requests will be described. With reference first to FIG. 2A, the process begins at (1) with a request for a secured browser configuration from an authenticating content provider 150 to the secured browser management portal 154. Illustratively, the authenticating content provider 150 may specify multiple aspects of the interaction with browser applications. In one aspect, the authenticating content provider 150 can limit content requests to specifically configured browser applications. In another aspect, the authenticating content provider 150 can further limit content requests to the above specifically configured browser applications that are associated with defined additional criteria, such as network identifiers, authenticated users, and the like. In still another aspect, the authenticating content provider 150 can then configure at least some aspects of the functionality of the browser application after content is being accessed or while content is being accessed.

At (2), the authenticating content provider 150 (or an associated service) can generate a programmatically configured browser application, or identify an existing programmatically configured browser application, in accordance with the request. Illustratively, the programmatically configured browser application includes specific configuration information as part of the executable code (e.g., the binary code) of the browser application. By inclusion of at least a portion of the configuration information as part of the executable code, the browser application can implement the limited functionality aspects without requiring or allowing interaction with the user or requested content, such as scripts, etc.

At (3), the secured browser management portal 154 returns secured browsing application information to the authenticating content provider 150. Illustratively, the secured browsing information can correspond to one or more information that will be used by the authenticating content provider 150 to validate whether content requests transmitted to the authenticating content provider 150 are from valid, authenticating secured browser applications. The secured browsing information can include hash information of the programmatically configured browser application, authenticated user information, authenticated network information, and the like. At (4), the secured browser management portal 154 also transmits (or causes transmission of) the provisioning of the programmatically configured browser application to the client computing devices.

Turning now to FIG. 2B, at (5), the client computing device 102 generates a content request to an authenticating content server 150. Illustratively, in one embodiment, a user can manipulate various interface devices or components to cause a browser application 116 to generate the content request. In other embodiments, the browser application 116, or other components, can automatically generate the content requests. Illustratively, the content request can correspond to a Web-based application that is requesting information of a sensitive nature, such as financial information, personal information, corporate information, and the like. The content request may be transmitted via a public network, such as the Internet, or a private or semi-private network or network connection.

At (6), the authenticating content server 150 responds to the content request by transmitting a request for browser configuration information. Illustratively, the request for browser configuration information may be transmitted independently of the request for content, such as via a different network interface, communication port, and communication protocol. The request for browser configuration information may illustratively be a request that the browser assert its configuration. In some embodiments, the request may incorporate aspects of challenge-response authentication, public key cryptography, or similar techniques.

At (7), the client computing device 102 receives and processes the request for browser configuration information. Illustratively, the browser configuration information can include information utilized to validate the programmatically configured browser. Illustratively, the browser configuration information includes information that is not easily modified or emulated. Examples include a hash of the programmatically configured browser application or a public key. In one embodiment, the client computing device 102 can maintain a set of information that will be utilized to respond, such as a hash of the programmatically configured executable code. In another embodiment, the client computing device 102 may be configured to determine, generate or otherwise calculate the set of information in real-time or substantial real-time. In other embodiments, the client computing device 102 can further obtain additional or supplemental information for utilization in conjunction with the set of information, including user authentication information, network identifiers (e.g., MAC address or network address information), computer hardware or software information, and the like.

At (8), the client computing device 102 transmits the set of information to the authenticating content server 150. At (9), the authenticating content server 150 processes the request to validate whether the requesting client computing device 102 has an appropriate programmatically configured browser application. In some embodiments, the determination may be based solely on whether a hash, key, or other identifier matches a known set of valid programmatically configured browser application hashes. In other embodiments, the determination may be based on the additional or supplemental information in combination with the hash, key, or other identifier. For example, the authenticating content server 150 can determine whether an otherwise valid programmatically configured browser is accessing the authenticating content server 150 via a known or authorized network address, ISP, etc.

If the authenticating content server 150 validates the browser configuration information, at (10), the authenticating content server 150 delivers, or causes to be delivered, the requested content. In some embodiments, the validation of the content request may control all aspects of the content request, such as an entire browsing session. In other aspects, the validation of the content request may only govern specific types of content requests or may be further limited by expiration criteria.

At (11), the client computing device 102 processes the received content. Illustratively, the authenticating content server 150 can activate or otherwise authorize the programmatically configured limitations to the functionality or function of the browser application 116. The authorization/activation may be done via a different protocol or communication channel from the received content. Alternatively, the authorization/activation can be included as part of the requested content.

Turning now to FIG. 2C, an embodiment will be described in which a programmatically configured browser application 116 interacts with a content provider, such as content provider 152, that is otherwise not configured to activate or authorize the programmatically controlled functionality or does not implement such configuration. At (5'), the client computing device 102 generates a content request to the content provider 152. Illustratively, in one embodiment, a user can manipulate various interface devices or components to cause a browser application 116 to generate the content request. In other embodiments, the browser application 116, or other components, can automatically generate the content requests. Illustratively, the content request can correspond to a Web-based application that is requesting information of a sensitive nature, such as financial information, personal information, corporate information, and the like. The content request may be transmitted via a public network, such as the Internet, or a private or semi-private network or network connection.

At (6'), the content provider 152 processes the content request in accordance with generally known networking communication protocols, such as the hypertext transfer protocol ("HTTP"). As illustrated in FIG. 2C, at (7') the content provider 152 returns the requested content without transmitting a request for a browser assertion.

At (8'), the client computing device 102 processes the requested content. In some embodiments, because the content provider 152 did not transmit a request for a browser assertion or authorize/activate the programmatically configured function limits, the browser application can process the content and generate/display in a way such that any limits (or a portion of the limits) do not apply to content provided by the content provider 152. By way of illustrative example, the authenticating content server 150 may correspond to an internal Web server that can provide sensitive information (e.g., corporate information), while the content provider 154 may correspond to an external Web server that may not have access to the sensitive information and in which the limitation of functionality is not of particular concern. In other embodiments, the programmatically configured browser may still implement some of the functionality limitations.

Figure 3A:
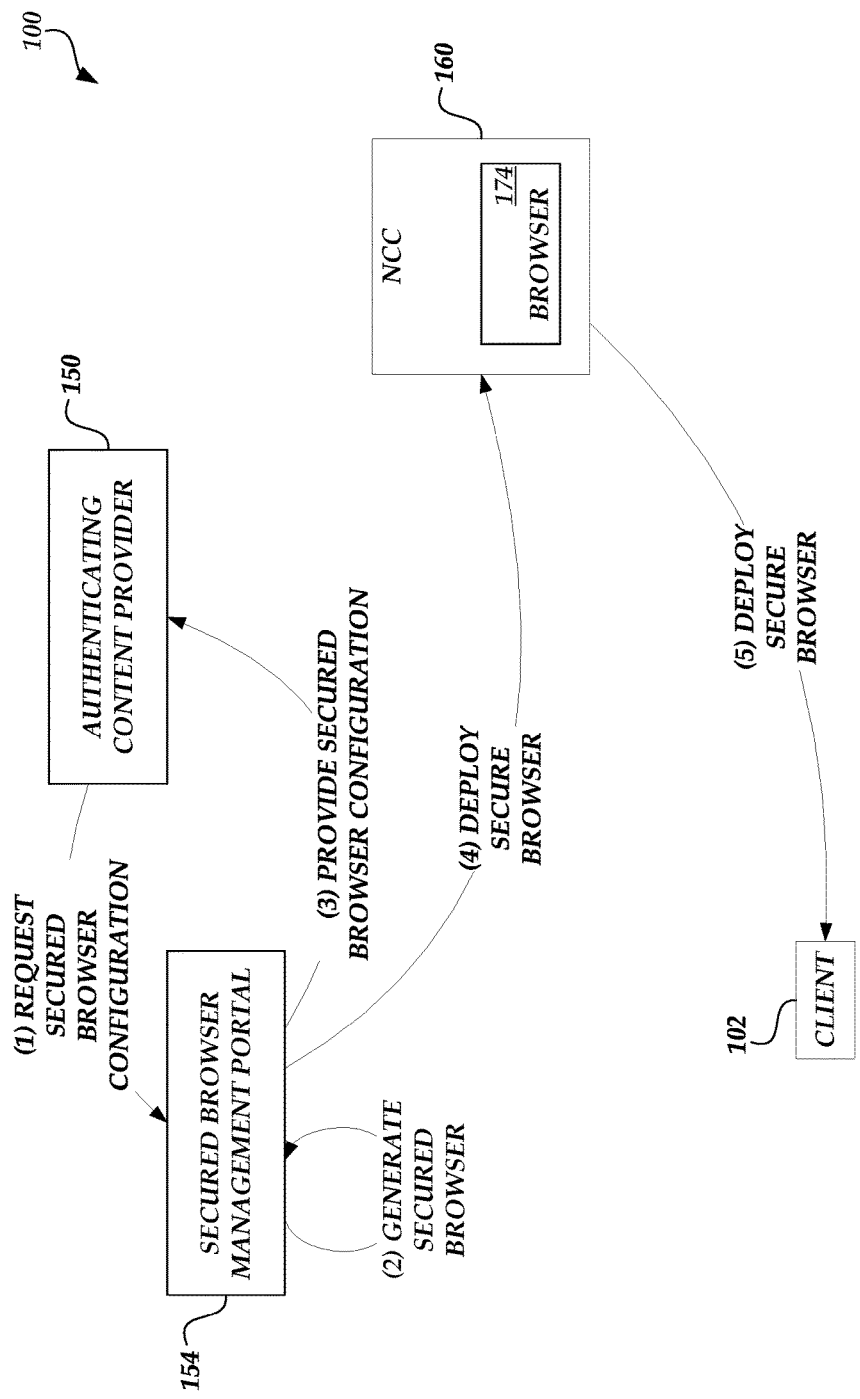

With reference now to FIGS. 3A-3D, block diagrams of the network topology of FIG. 1B illustrating the provisioning of programmatically controlled browser applications and processing of content requests will be described. With reference first to FIG. 3A, the process begins at (1) with the request for a secured browser configuration from the authenticating content provider 150 to the secured browser management portal 154. Illustratively, the authenticating content servers 150 may specify multiple aspects of the interaction with browser applications. In one aspect, the authenticating content servers 150 can limit content requests to specifically configured browser applications. In another aspect, the authenticating content servers 150 can further limit content requests to the above specifically configured browser applications that are associated with defined additional criteria, such as network identifiers, authenticated users, and the like. In still another aspect, the authenticating content servers 150 can then configure at least some aspects of the functionality of the browser application after content is being accessed or while content is being accessed.

At (2), the authenticating content servers 150 (or associated service) can generate a programmatically configured browser application, or identify an existing programmatically configured browser application, in accordance with the request. Illustratively, the programmatically configured browser application includes specific configuration information as part of the executable code (e.g., the binary code) of the browser application. By inclusion of at least a portion of the configuration information as part of the executable code, the browser application can implement the limited functionality aspects without requiring or allowing interaction with the user or requested content, such as scripts, etc.

At (3), the secured browser management portal 154 returns secured browsing application information to the authenticating content servers 150. Illustratively, the secured browsing information can correspond to one or more information that will be used by the authenticating content servers 150 to validate whether content requests transmitted to the authenticating content servers 150 are from valid secured browser applications. The secured browsing information can include hash information of the programmatically configured browser application, authenticated user information, authenticated network information, and the like.

At (4) and (5), the secured browser management portal 154 also transmits (or causes transmission of) the provisioning of the programmatically configured browser application to the network computing component 160 (or service provider associated with the network computing component) and one or more client computing devices 102. In some embodiments, both the network-based browser and the client-based browser may be the same (or substantially the same) programmatically configured browsers. In other embodiments, the network-based browser and the client-based browser may have different functionality. For example, the network-based browser application 174 may have more limited functions or may be optimized in a manner to facilitate the transmission/processing of content requests. In some embodiments, the secured browser management portal 154 may transmit configuration information, such as a configuration file, that interacts with a portion of the executable code of an already-deployed secure browser to programmatically configure the browser. Further, in some embodiments, the secured browser management portal 154 rather than the network computing component 160 may transmit the client-based browser application to the client computing devices 102.

Figure 3B:
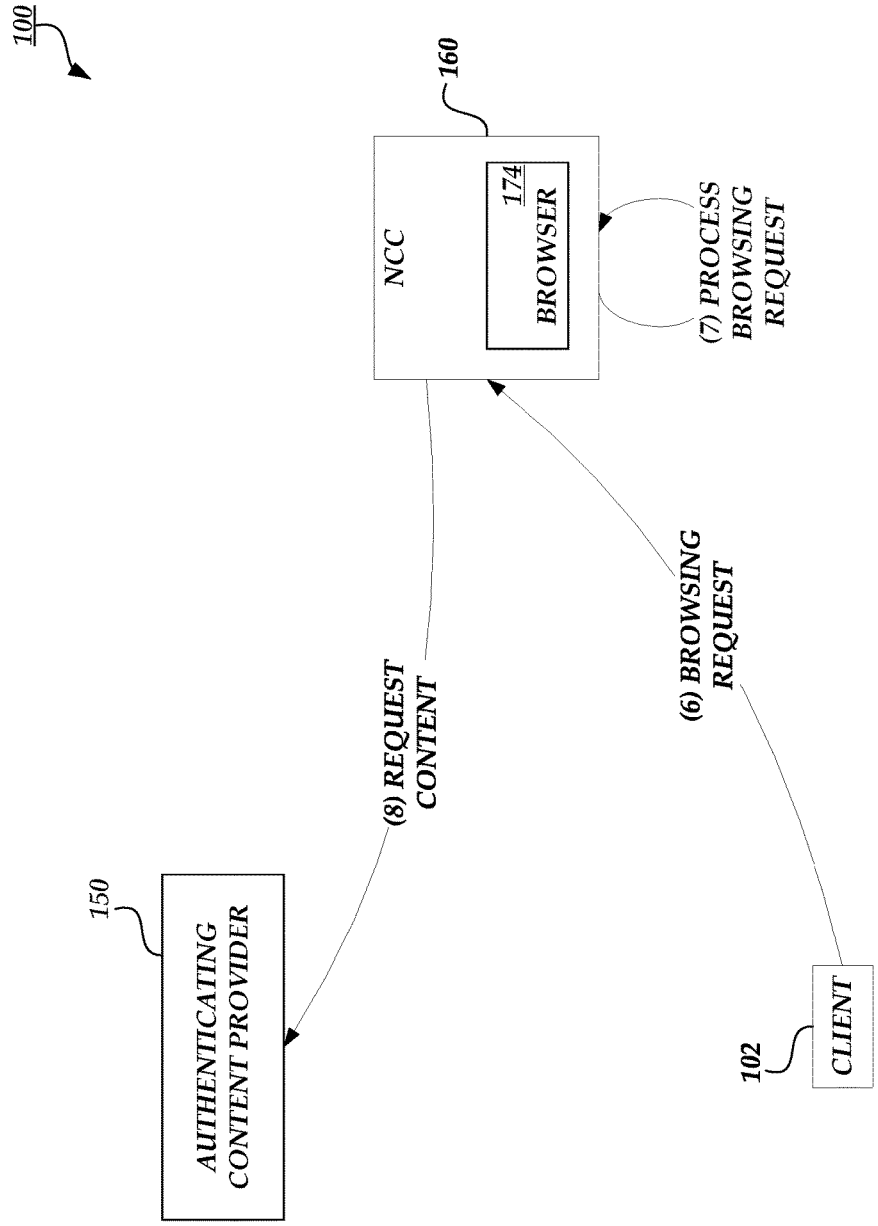

Turning now to FIG. 3B, at (6), the client computing device 102 generates a content request to the network based browser. Illustratively, in one embodiment, a user can manipulate various interface devices or components to cause a browser application 116 to generate the content request. In other embodiments, the browser application 116, or other components, can automatically generate the content requests. Illustratively, the content request can correspond to a Web-based application that is requesting information of a sensitive nature, such as financial information, personal information, corporate information, and the like. The content request may be transmitted via a public network, such as the Internet, or a private or semi-private network.

At (7), a server-based browser application 174 receives and processes the content request from the client 102. At (8), the server-based browser application 174 generates an independent request to a corresponding authenticating content server 150. The independent request is based at least in part on the content request from the client computing device 102, but is generated and transmitted from the server-based browser application 174.

Turning now to FIG. 3C, at (9), the authenticating content server 150 responds to the content request by transmitting a request for browser configuration information. Illustratively, the request for browser configuration information may be transmitted independently of the request for content, such as via a different network interface, communication port, and communication protocol. At (10), the network based browser 174 receives and processes the request for browser configuration information and at (11) may optionally pass the request to the client-side browser application. Illustratively, the request for browser configuration information may be a request for information about the network-based browser configuration, the client-based browser configuration, or both. Further, in some embodiments, the request may be fulfilled by the network-based browser application 174 regardless of the information sought. For example, the network-based browser application 174 may request that the client-based browser application assert its configuration before the network-based browser application generates the independent request to the authenticating content server 150.

Figure 3D:
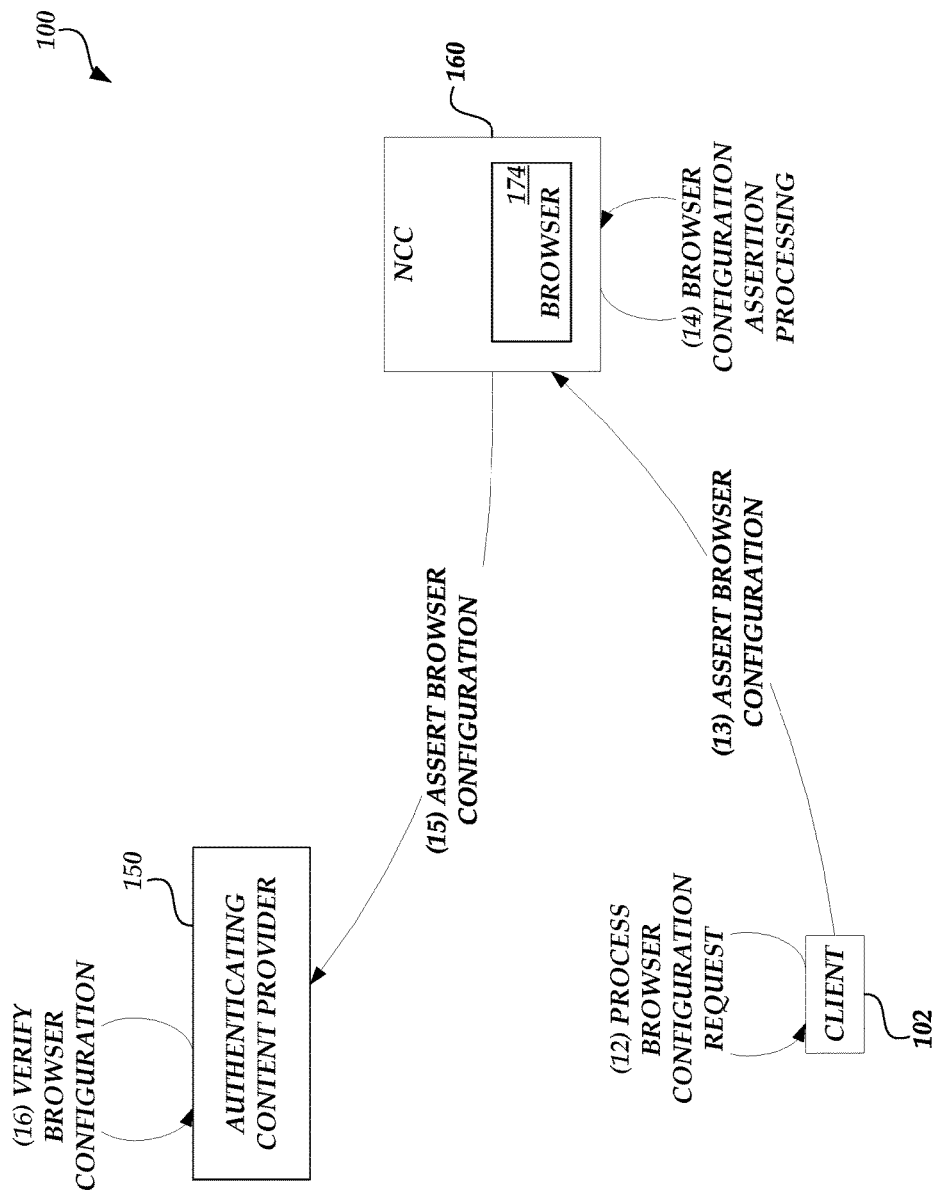

With reference now to FIG. 3D, at (12), the client computing device 102 processes the request for browser configuration information. Illustratively, the browser configuration information can include information utilized to validate the programmatically configured browser. Illustratively, the browser configuration information includes information that is not easily modified or emulated. Examples include a hash of the programmatically configured browser application or a public key. In one embodiment, the network based browser 174 can maintain a set of information that will be utilized to respond, such as a hash of the programmatically configured executable code. In another embodiment, the network-based browser 174 may be configured to determine, generate or otherwise calculate the set of information in real-time or substantial real-time. In other embodiments, the network-based browser 174 can further obtain additional or supplemental information for utilization in conjunction with the set of information, include user authentication information, network identifiers (e.g., MAC address or network address information), computer hardware or software information and the like.

In still other embodiments, the network based browser 174 may require additional information from the client-based browser application 116. As illustrated in FIG. 3C, the network based browser 174 can transmit the request to the client computing device 102, in whole or in part.

At (13), the client computing device 102 transmits the set of information to the network based browser 174. At (14), the network based browser application 174 processes the configuration information transmitted by the client computing device 102. In some embodiments, the network based browser 174 can compare the set of information to a locally maintained set of information to ensure the information corresponds. In other embodiments, the network based browser may pass along the set of information to the authenticating content server 150. At (15), the network based browser 174 transmits the processed set of information to the authenticating content server 150.

At (16), the authenticating content server 150 processes the request to validate whether the requesting client computing device 102 (and, in some embodiments, the corresponding network computing device 160 or any combination of the two) has an appropriate programmatically configured browser application. In some embodiments, the determination may be based solely on whether a hash (or other identifier) matches a known set of valid programmatically configured browser application hashes. In other embodiments, the determination may be based on the additional or supplemental information in combination with the hash (or other identifier). For example, the authenticating content server 150 can determine whether an otherwise valid programmatically configured browser is accessing the authenticating content server 150 via a known or authorized network address, ISP, etc.

If the authenticating content server 150 validates the browser configuration information, the authenticating content server 150 delivers, or causes to be delivered, the requested content to the network based browser 174. In some embodiments, the validation of the content request may control all aspects of the content request, such as an entire browsing session. In other aspects, the validation of the content request may only govern specific types of content requests or may be further limited by expiration criteria. The network based browser can process some portion of the content and transmit the processed information along with any unprocessed information to the client computing device 102. The client computing device 102 processes the received content. Illustratively, the authenticating content server 150 can activate or otherwise authorize the programmatically configured limitations to the functionality or function of the browser application 116. The authorization/activation may be done via a different protocol or communication channel from the received content. Alternatively, the authorization/activation can be included as part of the requested content.

Figure 4:
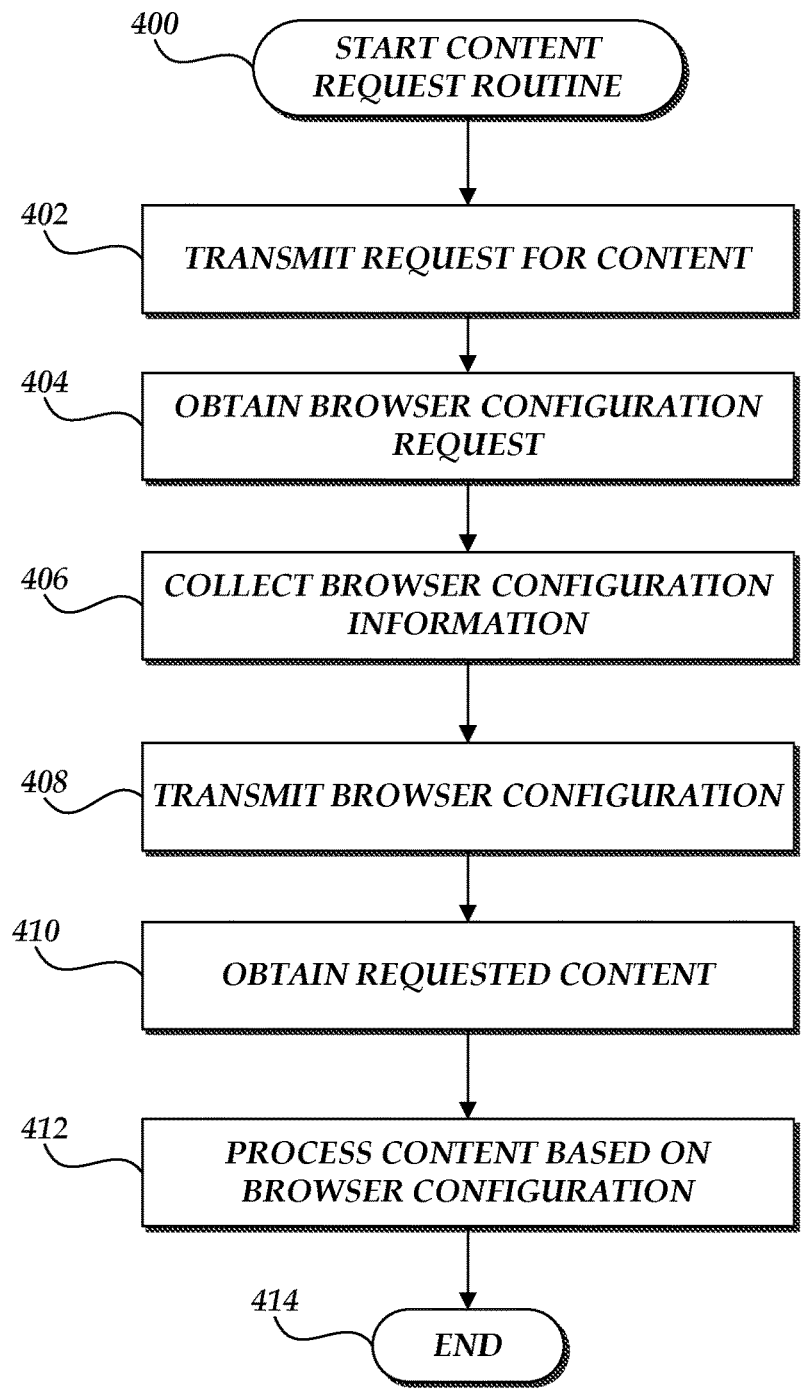
FIG. 4 is a flow diagram depicting an illustrative content request processing routine implemented by a browser application in accordance with the present disclosure.

Turning now to FIG. 4, an illustrative content request processing routine implemented by a browser application will be described. Illustratively, routine 400 will be described with relation to implementation by programmatically controlled browser application, such as browser application 116 or browser application 174. However, one skilled in the relevant art will appreciate that additional or alternative components may also implement at least portions of routine 400. Additionally, aspects of routine 400 may be implemented by both the browser application 116 and browser application 174. Accordingly, reference will be made solely to a programmatically configured software application.

At block 402, the programmatically configured software application generates a content request for content. The request for content may be directly provided to an authenticating content server 150 from a client computing device 102 or indirectly through a network computing component having an instantiated browser application 174. As previously described, a user can manipulate various interface devices or components to cause a browser application 116 to generate the content request. In other embodiments, the browser application 116, or other components, can automatically generate the content requests. Illustratively, the content request can correspond to a Web-based application that is requesting information of a sensitive nature, such as financial information, personal information, corporate information, and the like. The content request may be transmitted via a public network, such as the Internet, or a private or semi-private network.

In response to receiving the content request from the programmatically configured software application, the authenticating content server 150 responds to the content request by transmitting a request for browser configuration information. Illustratively, the request for browser configuration information may be transmitted independently of the request for content, such as via a different network interface, communication port, and communication protocol. Additionally, in other embodiments, the request from the authenticating content server 150 can be characterized as a cryptographic assertion. Accordingly, at block 404, the programmatically configured software application receives the browser configuration information request and processes it at block 406. Illustratively, the browser configuration information can include information utilized to validate the programmatically configured browser. Illustratively, the browser configuration information includes information that is not easily modified or emulated. Examples include a hash of the programmatically configured browser application or a public key. In one embodiment, the client computing device 102 can maintain a set of information that will be utilized to respond, such as a hash of the programmatically configured executable code. In another embodiment, the client computing device 102 may be configured to determine, generate or otherwise calculate the set of information in real-time or substantial real-time. In other embodiments, the client computing device 102 can further obtain additional or supplemental information for utilization in conjunction with the set of information, include user authentication information, network identifiers (e.g., MAC address or network address information), computer hardware or software information and the like.

At block 408, the programmatically configured software application transmits the set of information to the authenticating content server 150. In response, the authenticating content server 150 processes the request to validate whether the requesting client computing device 102 has an appropriate programmatically configured browser application. In some embodiments, the determination may be based solely on whether a hash (or other identifier) matches a known set of valid programmatically configured browser application hashes. In other embodiments, the determination may be based on the additional or supplemental information in combination with the hash (or other identifier). For example, the authenticating content server 150 can determine whether an otherwise valid programmatically configured browser is accessing the authenticating content server 150 via a known or authorized network address, ISP, etc.

If the authenticating content server 150 validates the browser configuration information, at block 410, the programmatically configured software application receives the requested content along with any activation information from the authenticating content server 150. In some embodiments, the validation of the content request may control all aspects of the content request, such as an entire browsing session. In other aspects, the validation of the content request may only govern specific types of content requests or may be further limited by expiration criteria.

At block 412, the programmatically configured software application processes the received content. Illustratively, the authenticating content server 150 can activate or otherwise authorize the programmatically configured limitations to the functionality or function of the browser application 116. The authorization/activation may be done via a different protocol or communication channel from the received content. Alternatively, the authorization/activation can be included as part of the requested content. By way of non-limiting example, the programmatically configured code can limit functionality of the browser application, such as limiting copy/paste, screen captures, keyboard, mouse or other input functionality, printing, saving/archiving, and the like. In other example, the programmatically configured code can supplement the requested content with identification information such as watermarks, logging information, visual or audible identifiers, etc. Other examples of limited functionality or enhanced tracking information may also be included in accordance with other aspects of the present disclosure.

As previously indicated, the programmatic configuration may endure for the entire time a user accesses content from the programmatically configured software application. In another aspect, the programmatic configuration may expire based on browsing sessions, time, and the like. At block 414, the routine 400 terminates.

Figure 5:
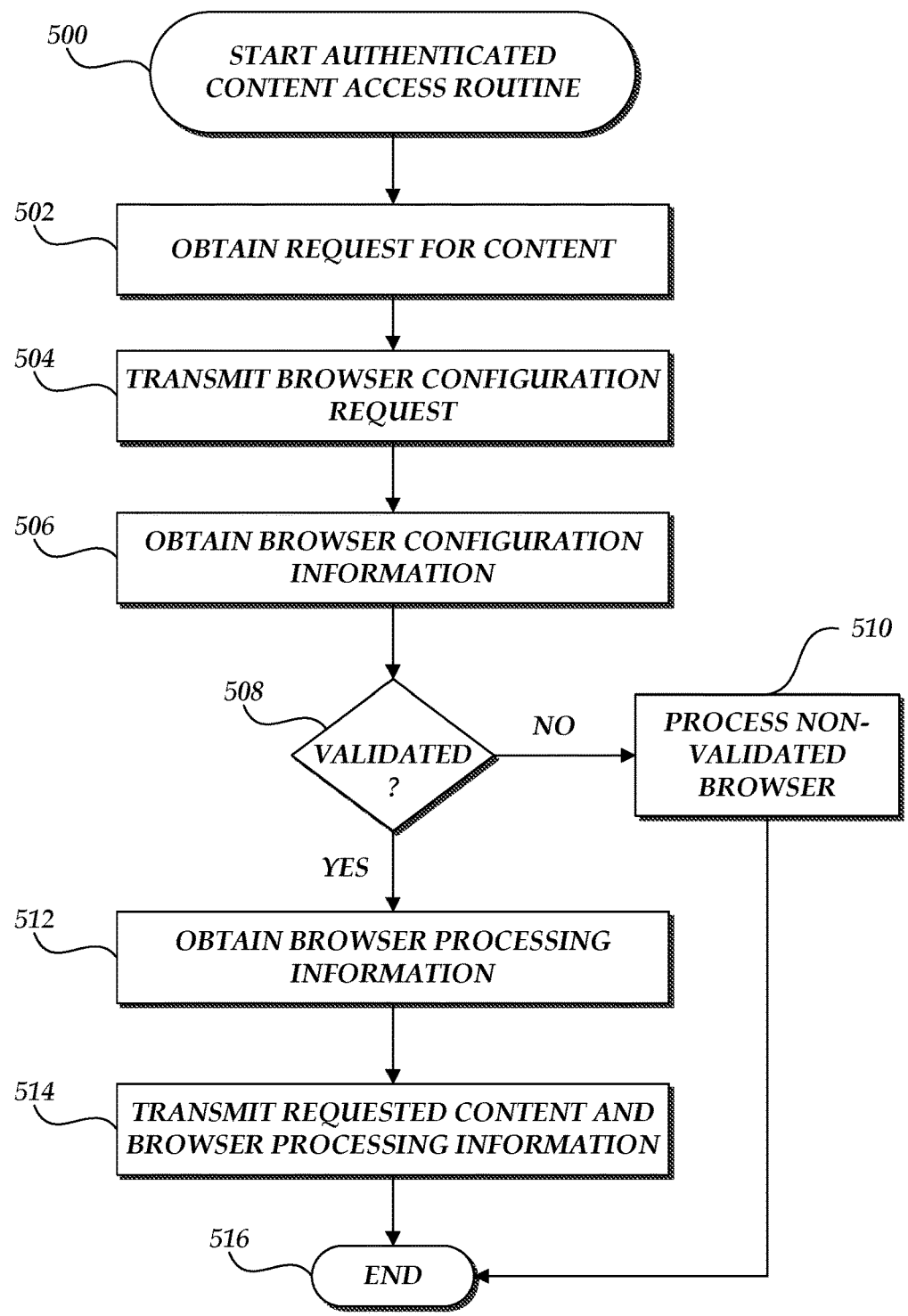
FIG. 5 is a flow diagram depicting an illustrative authenticated content access routine implemented by authenticating content provider process in accordance with the present disclosure.

Turning now to FIG. 5, an illustrative content request processing routine 500 implemented by an authenticating content server 150 will be described. However, one skilled in the relevant art will appreciate that additional or alternative components may also implement at least portions of routine 500. At block 502, the authenticating content server 150 obtains a request for content. The request for content may be directly provided to an authenticating content server 150 from a client computing device 102 or indirectly through network computing component having an instantiated browser application 174. As previously described, a user can manipulate various interface devices or components to cause a browser application 116 to generate the content request. In other embodiments, the browser application 116, or other components, can automatically generate the content requests. Illustratively, the content request can correspond to a Web-based application that is requesting information of a sensitive nature, such as financial information, personal information, corporate information, and the like. The content request may be transmitted via a public network, such as the Internet, or a private or semi-private network.

At block 504, the authenticating content server 150 responds to the content request by transmitting a request for browser configuration information. Illustratively, the request for browser configuration information may be transmitted independently of the request for content, such as via a different network interface, communication port, and communication protocol. A programmatically configured software application receives and processes the browser assertion. Illustratively, the browser configuration information can include information utilized to validate the programmatically configured browser. Illustratively, the browser configuration information includes information that is not easily modified or emulated. Examples include a hash of the programmatically configured browser application or a public key. The programmatically configured software application transmits the set of information to the authenticating content server 150.

In response, at block 506, the authenticating content server 150 processes the request to validate whether the requesting client computing device 102 has an appropriate programmatically configured browser application. At decision block 508, a test is conducted to determine whether the set of information is indicative of a valid programmatically configured browser or a valid request from a valid programmatically configured browser. In some embodiments, the determination may be based solely on whether a hash (or other identifier) matches a known set of valid programmatically configured browser application hashes. In other embodiments, the determination may be based on the additional or supplemental information in combination with the hash (or other identifier). For example, the authenticating content server 150 can determine whether an otherwise valid programmatically configured browser is accessing the authenticating content server 150 via a known or authorized network address, ISP, etc.

If the authenticating content server 150 validates the browser configuration information, at block 512, the authenticating content server 150 obtains any activation information that will be utilized to activate or authorize programmatically configurations. In some embodiments, the validation of the content request may control all aspects of the content request, such as an entire browsing session. In other aspects, the validation of the content request may only govern specific types of content requests or may be further limited by expiration criteria. At block 514, the authenticating content server 150 transmits the requested content (or otherwise provides access) along with any additional configuration activation/authorization information.

If, at decision block 508, the request for content cannot be validated (either by an invalid browser or an invalid browser request), at block 510, the authenticating content server 150 processes a non-validated request. In one embodiment, the authenticating content server 150 can reject the request outright or require additional information. In another embodiment, the authenticating content server 150 may still provide some content, but limit the content or otherwise filter. In still other embodiments, the authenticating content server 150 can implement an error checking process or alarm process. At block 516, the routine 500 terminates.

Figure 6:
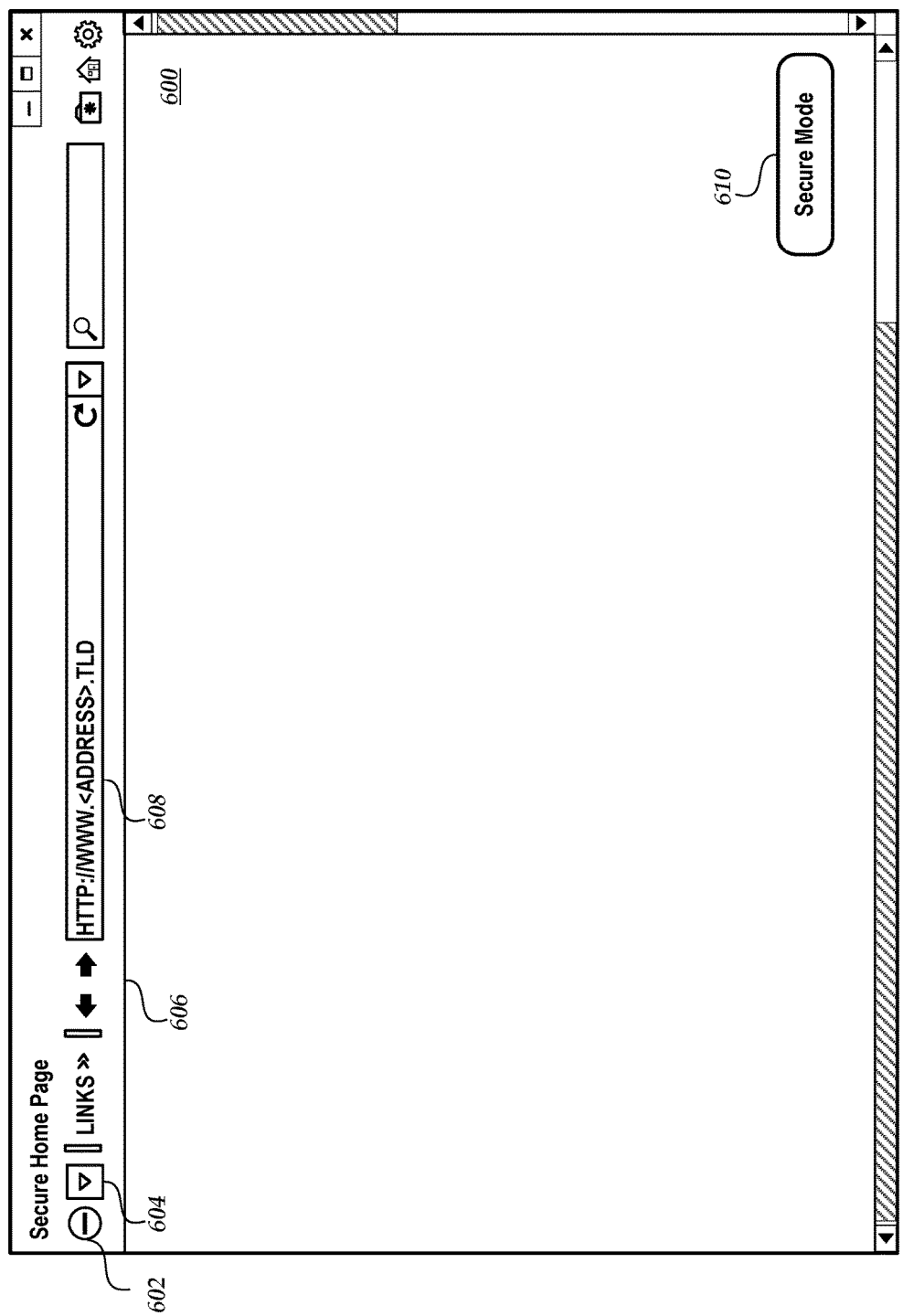
FIG. 6 is a block diagram of an illustrative screen display generated by a browser application executing on a computing device.

With reference now to FIG. 6, in one embodiment, the programmatically configured browser may be configured to identify or remind a user when limited functionality has been activated. FIG. 6 is a block diagram of an illustrative screen display 600 generated by a browser application executing on a computing device 102. Illustratively, screen display 600 illustrates multiple visualization techniques in combination. However, such visualizations need not be combined in some embodiments. Additionally, additional or alternative visualization (including no visualizations) may also be implemented as well as alternatives to visual identifiers/reminders.

With reference to the FIG. 6, the screen display in one embodiment can include visualizations that form part of the controls/structure of the browser application, often referred to as the "chrome." In other embodiments, the visualizations can be displayed in the area of the browser application traditionally utilized to display content. By way of example, the screen display 600 can include an identifier 602 and drop-down 604 to provide a user with a quick reference that limited functionality is in place and to find out more detail about the limits to functionality. In other examples, different colors, line weights, textures, fonts, treatments may be applied to the navigation areas 606 and 608. In still another example, separate display objects 610 may also be provided to provide visualizations.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for managing content comprising:
   receiving, by a programmatically configurable server-based browser application, a first request for content from a client-based browser application;
   transmitting, by the programmatically configurable server-based browser application, a second request for content to an authenticating content server, the second request transmitted in accordance with a first communication port and a first communication protocol;
   receiving, by the programmatically configurable server-based browser application, an authentication request from the authenticating content server, wherein the authentication request is transmitted in accordance with a second communication port or a second communication protocol, wherein the authentication request comprises a request to verify that the programmatically configurable server-based browser application is configurable to activate a first programmatic configuration, and wherein the first programmatic configuration causes the programmatically configurable server-based browser application to limit at least one aspect of its functionality;
   obtaining, by the programmatically configurable server-based browser application, information responsive to the authentication request, the information enabling verification that the programmatically configurable server-based browser application is configurable to activate the first programmatic configuration;
   transmitting, by the programmatically configured server-based browser application, the information responsive to the authentication request to the authenticating content server;
   based on a processing of the transmitted information responsive to the authentication request, receiving, by the programmatically configurable server-based browser application, at least a first portion of the requested content and data communications that cause an activation of the programmatic configuration;
   processing, by the programmatically configurable server-based browser application, the data communications and at least the first portion of the requested content, wherein processing the data communications includes activating the first programmatic configuration; and
   transmitting, by the programmatically configured server-based browser application, the processed first portion of the requested content to the client-based browser application.

2. The computer-implemented method of claim 1, wherein obtaining the information responsive to the authentication request includes obtaining at least one additional information corresponding to the programmatically configurable server-based browser application.

3. The computer-implemented method of claim 2, wherein the at least one additional information includes at least one of user identification information or network identification information.

4. The computer-implemented method of claim 1, wherein obtaining the information responsive to the authentication request includes obtaining information from the client-based browser application.

5. The computer-implemented method of claim 1 further comprising transmitting, by the programmatically configurable server-based browser application, a second data communications to the client-based browser application, wherein the client-based browser application processes the second data communications, and wherein processing the second data communications includes activating a second programmatic configuration that limits functionality of at least one aspect of the client-based browser application.

6. The computer-implemented method of claim 1, wherein the functionality of the programmatically configurable server-based browser application that is limited by the first programmatic configuration comprises at least one of copy/paste functionality, printing functionality, or screen capture functionality.

7. A system for remote content rendering comprising:
a first processor and a first memory for executing first computer executable instructions, the first computer executable instructions implementing a programmatically configurable server-based browser application that is operable to at least:
receive, from a client-based browser application, a request for content, wherein the content is available from an authenticating content server;
cause transmission of the request for the content to the authenticating content server;
receive, from the authenticating content server, a browser configuration assertion, wherein the browser configuration assertion is independent of the request for the content, and wherein the browser configuration assertion specifies a browser configuration;
obtain information responsive to the browser configuration assertion, the information responsive to the browser configuration assertion enabling verification that at least one of the server-based browser application or the client-based browser application is configurable to implement the browser configuration specified in the browser configuration assertion;
transmit the information responsive to the browser configuration assertion to the authenticating content server;
based on a processing of the transmitted information responsive to the browser configuration assertion, receive data communications causing an activation of the browser configuration; and
transmit at least a portion of unprocessed content received from the authenticating content server to the client-based browser application.

8. The system of claim 7, wherein the programmatically configurable server-based browser application is further operable to receive the browser configuration assertion from the authenticating content server via at least one of a different communication port or different communication protocol.

9. The system of claim 7, wherein the programmatically configurable server-based browser application is further operable to obtain additional information corresponding to the programmatically configurable server-based browser application.

10. The system of claim 9, wherein the additional information corresponds to at least one of a user identifier or network information.

11. The system of claim 7, wherein the programmatically configurable server-based browser application is further operable to transmit a request to the client-based browser application for the information responsive to the browser configuration assertion.

12. The system of claim 7, wherein the programmatically configurable server-based browser application is further operable to generate the information responsive to the browser configuration assertion.

13. The system of claim 7, wherein the information responsive to the browser configuration assertion comprises information responsive to a cryptographic assertion.

14. The system of claim 7, wherein the browser configuration limits at least one functionality of the programmatically configured server-based browser application.

15. The system of claim 7, wherein the browser configuration incorporates at least one piece of additional data in the received content.

16. The system of claim 7, wherein the information responsive to the browser configuration assertion comprises one or more of a public key, hash, challenge-response authentication, or a network address.

17. A system for remote content rendering comprising:
a first processor and a first memory for executing first computer executable instructions, the first computer executable instructions implementing a programmatically configurable client-based browser application that is operable to at least:
transmit a request to a programmatically configurable server-based browser application for content, wherein the content is available from an authenticating content server;
receive a browser configuration assertion, the browser configuration assertion independent of the request for content, the browser configuration assertion identifying at least one browser configuration, and the browser configuration assertion specifying that the programmatically configurable client-based browser application must be configurable to implement the at least one browser configuration;
obtain information responsive to the browser configuration assertion, the information responsive to the browser configuration assertion enabling verification that the programmatically configurable client-based browser application is configurable to implement the at least one browser configuration, wherein the information responsive to the browser configuration assertion is common to the programmatically configurable client-based browser application and the programmatically configurable server-based browser application;
transmit the information responsive to the browser configuration assertion; and
based on a processing of the transmitted information responsive to the browser configuration assertion, receive data communications causing an activation of the browser configuration.

18. The system of claim 17, wherein the browser configuration limits at least one functionality of the programmatically configured client-based browser application.

19. The system of claim 17, wherein the programmatically configurable client-based browser application is configured to receive processed content from the programmatically configurable server-based browser application, and wherein the programmatically configurable server-based browser application generates the processed content in accordance with the browser configuration.

20. The system of claim 17, wherein the programmatically configurable client-based browser application is operable to transmit the information responsive to the browser configuration assertion directly to the authenticating content server.

21. The system of claim 17, wherein the information responsive to receipt of the browser configuration assertion is unique to the programmatically configurable client-based browser application.

22. The system of claim 21, wherein the programmatically configurable client-based browser application is further operable to generate the information responsive to the browser configuration assertion.

* * * * *